United States Patent
Ghouti et al.

(10) Patent No.: US 9,740,480 B1
(45) Date of Patent: Aug. 22, 2017

(54) APPARATUS AND METHODOLOGIES FOR CODE REFACTORING

(71) Applicant: KING FAHD UNIVERSITY OF PETROLEUM AND MINERALS, Dhahran (SA)

(72) Inventors: Lahouari Ghouti, Dhahran (SA); Mohammad Alshayeb, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 15/047,253

(22) Filed: Feb. 18, 2016

(51) Int. Cl.
    G06F 9/44 (2006.01)
(52) U.S. Cl.
    CPC .................................. G06F 8/72 (2013.01)
(58) Field of Classification Search
    CPC ................................................... G06F 8/72
    See application file for complete search history.

(56) References Cited

U.S. PATENT DOCUMENTS

| | | | |
|---|---|---|---|
| 7,379,858 B2 * | 5/2008 | Lim | G06F 9/44 703/22 |
| 7,451,439 B2 | 11/2008 | Nickell et al. | |
| 2008/0215891 A1 * | 9/2008 | Horne | G06F 21/16 713/187 |
| 2009/0037873 A1 * | 2/2009 | Ahadian | G06F 8/72 717/105 |
| 2012/0060142 A1 * | 3/2012 | Fliess | G06F 8/70 717/102 |
| 2013/0104104 A1 | 4/2013 | Murthy et al. | |

OTHER PUBLICATIONS

I. Griffith et al., "True Refactor: An Automated Refactoring Tool to Improve Legacy System and Application Comprehensibility", 2011, pp. 1-6 http://www.cs.montana.edu/izurieta/pubs/caine2011isaac.pdf.
T.Pandiyavathi, et al. "Detection of Optimal Refactoring Plans for Resolution of Code Smells" International Journal of Advanced Research in Computer and Communication Engineering, vol. 3, Issue 5, May 2014, pp. 6406-6411.
D.J. White "A Survey of Applications of Markov Decision Processes" The Journal of the Operational Research Society, vol. 44, No. 11, Nov. 1993, pp. 1073-1096.
D.J. White "Further Real Applications of Markov Decision Processes", Interfaces, vol. 18, No. 5,, Sep.-Oct. 1988, pp. 55-61.
D.J. White, "Real Applications of Markov Decision Processes" Interfaces, vol. 15, No. 6, Nov.-Dec. 1985, pp. 73-83.

* cited by examiner

*Primary Examiner* — Hang Pan
(74) *Attorney, Agent, or Firm* — Oblon, McClelland, Maier & Neustadt, L.L.P.

(57) ABSTRACT

Methods and apparatuses are provided for code refactoring. The method includes acquiring a code and identifying, using processing circuitry and based on a Markov decision process model, a refactoring sequence. The refactoring sequence includes a plurality of refactoring steps to be applied to the code. Further, the method includes refactoring, by the processing circuitry, the code according to the refactoring sequence.

16 Claims, 11 Drawing Sheets

000
APPARATUS AND METHODOLOGIES FOR CODE REFACTORING

BACKGROUND

Software quality is a primary defining factor in a software development cycle. Various mechanisms and strategies, such as software refactoring, are adopted during the software development cycle to ensure software quality and reliability. Software refactoring provides for validated changes of the software internal structure while ensuring the preservation of its external behavior in terms of quality and reliability.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraph has been provided by way of general introduction, and is not intended to limit the scope of the following claims. The described embodiments, together with further advantages, will be best understood by reference to the following detailed description taken in conjunction with the accompanying drawings.

SUMMARY

According to an embodiment of the present disclosure, there is provided a method for code refactoring. The method includes acquiring a code and identifying using processing circuitry and based on a Markov decision process model, a refactoring sequence. The refactoring sequence includes a plurality of refactoring steps to be applied to the code. Further, the method includes refactoring, by the processing circuitry, the code according to the refactoring sequence.

According to an embodiment of the present disclosure, there is provided a non-transitory computer-readable medium storing instructions which, when executed by a computer, cause the computer to perform the above-described method for code refactoring.

According to an embodiment of the present disclosure, there is provided an apparatus for code refactoring. The apparatus comprises processing circuitry configured to acquire a code and identify based on a Markov decision process model, a refactoring sequence. The refactoring sequence includes a plurality of refactoring steps to be applied to the code. Further, the processing circuitry is configured to refactor the code according to the refactoring sequence.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
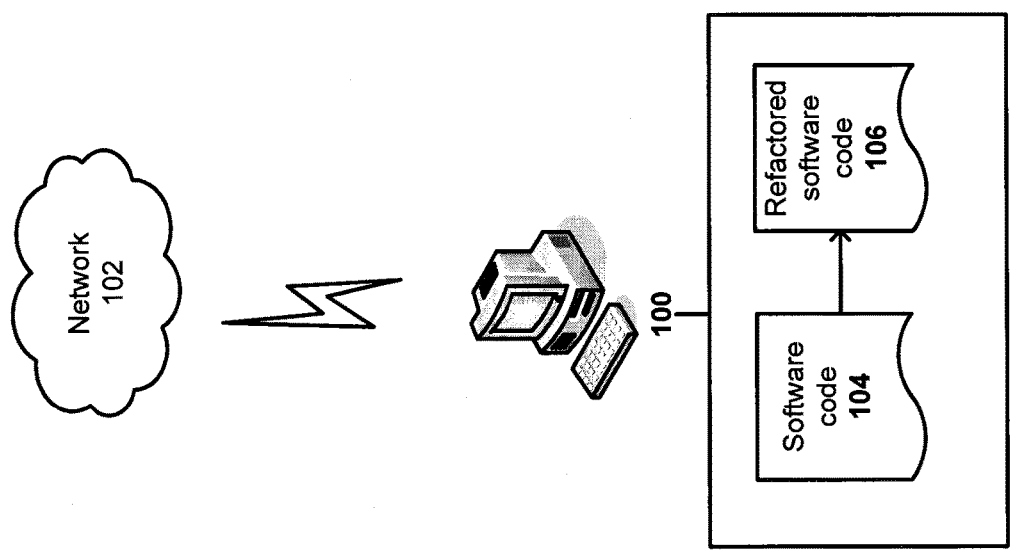
FIG. 1 is a schematic of a development workstation upon which to execute a method for code refactoring according to one example.

Referring now to the drawings, wherein like reference numerals designate identical or corresponding parts throughout several views, the following description relates to an apparatus and associated methodology for refactoring a block of software or a code. The method identifies an optimal order of refactoring steps.

The design of software systems can exhibit several problems that may be due to inefficient analysis and design during the initial development of the software. In addition, the problems may be due to software ageing since software quality degenerates with time. Design problems are referred to as bad smells at code or design level and the process of removing them is called refactoring where the software structure is improved without any modification in the behavior.

Software refactoring provides guidelines for validated changes of the software internal structure while ensuring the preservation of its external behavior in terms of quality and reliability. Moreover, several refactoring steps may emerge during the software development cycle with a differing order of application. The refactoring order can have negative impacts on the targeted software quality, reliability, and maintainability among other measures. However, the negative impacts are revealed at the final stages of the software development cycle, which could be disastrous to the development efforts in terms of cost and reputation. Accordingly, what is needed, as recognized by the present inventors, is a method and an apparatus capable of determining a refactoring order.

Described herein is a systematic method for determining an optimal order of refactoring steps based on an "optimal refactoring policy" using reinforcement learning and Markov decision processes (MDPs). The determined optimal policy ensures that the targeted quality measures are met based on finite refactoring steps. In addition, the apparatus and associated methodology described herein has the ability to "correct" a refactoring process that could have started earlier using any given refactoring scheme regardless of the application order. Finally, other quality measures (internal and external) can be integrated with the optimal policy described herein and emerging refactoring schemes as well.

Refactoring is a process of changing the internal structure of the software without altering its behavior as described in M. Fowler, Refactoring: Improving the Design of Existing code, Addison-Wesley, 1999 incorporated herein by reference in its entirety. Refactoring tends to reduce the software complexity by improving the internal structure of the software. However, different refactoring methods have different impact on the quality of the software as described in M.

Alshayeb, "Empirical Investigation of Refactoring Effect on Software Quality," Information and Software Technology Journal, vol. 51, pp. 1319-1326, 2009. Therefore, classifications of different refactoring methods' impact on software quality have been described in K. Elish and M. Alshayeb, "A Classification of Refactoring Methods Based on Software Quality Attributes," The Arabian Journal for Science and Engineering, vol. 36, pp. 1253-1267, 2011 and K. Elish and M. Alshayeb, "Using Software Quality Attributes to Classify Refactoring to Patterns," Journal of Software, 2011.

The resolution of a bad smell may have impact on the resolution of other bad smells in the code. Thus, the resolution order of bad smells may have an impact on the refactored software code as described in H. Liu, L. Yang, Z. Niu, Z. Ma, and W. Shao, "Facilitating software refactoring with appropriated resolution order of bad smells," Proceedings of the 7$^{th}$ Joint meeting of the European software engineering conference and the ACM SIGSOFT symposium on the foundations of software engineering, Amsterdam, The Netherlands, 2009.

A technique to detect the implicit dependencies between refactoring using graph transformation rules is described in T. Mens, G. Taentzzer, and O. Runge, "Analyzing refactoring dependencies using graph transformation," Software and Systems Modeling, vol. 6, pp. 269-285, 2007.

An approach to reduce the search space for refactoring opportunities is described in E. Piveta, J. Araújo, M. Pimenta, A. Moreira, P. Guerreiro, and R. T. Price, "Searching for Opportunities of Refactoring Sequences: Reducing the Search Space," Proceedings of the 2008 32nd Annual IEEE International Computer Software and Applications Conference, 2008, by providing mechanisms to create and simplify a Deterministic Finite Automata (DFA) representing the applicable refactoring sequences in the existing software. The search space (sequences) was reduced by a 62%.

An approach to identify an optimal refactoring sequence that considers the number of removed bad smells, maintainability, the size of refactoring sequence, and the number of modified program elements is described in P. Meananeatra, "Identifying refactoring sequences for improving software maintainability," in Automated Software Engineering (ASE), 2012 Proceedings of the 27th IEEE/ACM International Conference on, 2012, pp. 406-409. The approach describes a prototype that accepts the refactoring objective and the code as an input to generate the output in the form of an optimal refactoring sequence.

An approach for selecting a sequence of refactoring techniques using Greedy Algorithm to enhance software maintainability is described in R. Wongpiang and P. Muenchaisri, "Selecting sequence of refactoring techniques usage for code changing using greedy algorithm," in Electronics Information and Emergency Communication (ICEIEC), 2013 IEEE 4th International Conference on, 2013, pp. 160-164.

Another approach to optimize sequences of refactoring transformations (steps) to reduce the composition time for product line programs using refactoring feature modules (RFMs) for refactoring transformation is described in M. Kuhlemann, L. Liang, and G. Saake, "Algebraic and Cost-based Optimization of Refactoring Sequences," in Proceedings of the 2nd International Workshop on Model-driven Product Line Engineering, 2010, pp. 37-48.

A detection and resolution sequence for different kinds of bad smells method is described in H. Liu, Z. Ma, W. Shao, and Z. Niu, "Schedule of Bad Smell Detection and Resolution: A New Way to Save Effort," IEEE Transactions on Software Engineering, vol. 38, pp. 220-235, 2012. The detection and resolution method was evaluated using two open source applications. When bad smells are detected and resolved using the detection and resolution method, a reduction in effort to almost 20% can be achieved.

Decision-making can be a hard problem given the uncertainty surrounding it. Several real-life problems are amenable to what is commonly called sequential decision problems under uncertainty. In this disclosure, the software refactoring process is treated as a sequential decision problem under uncertainty. The first feature of such treatment lies in the relation between the current refactoring decision and future refactoring decisions. Therefore, the refactoring process is not considered as a single decision-making problem but rather as a sequence of several decision-making problems where outcomes affect each other in a sequence. At each step of the refactoring sequence, a decision-maker needs to decide on which "refactoring action" to apply from a plurality of refactoring steps (or transformations). The decision at each step has an impact on the overall software quality. Decision-making and typical planning problems, often encountered in the fields of artificial intelligence and graph theory, are described in M. L. Puterman, Markov Decision Processes: Discrete Stochastic Dynamic Programming, John Wiley & Sons, 2014.

Software refactoring injects uncertainties in the consequences of all refactoring decisions referred to as actions herein. Another dimension of uncertainty lies in the lack of a-priori knowledge of the effects of the current refactoring decision (action). The uncertainty may be formulated in a probabilistic manner since a deterministic form may not be possible. As such, the representation of software refactoring described herein is underpinned with various theories of dynamic programming and decision making under uncertainty that may lead to different problem formalizations and related approaches to "optimal" solutions. Among these approaches, the theory of expected utility maximization may be the workhorse for deriving the "optimal sequence" of refactoring decisions (actions). Consequently, the method described herein allows the combination of sequential and uncertain decision-making problems. Markov decision processes (MDPs) may be used for such problems as described in O. Sigaud and Buffet, eds. Markov Decision Processes in Artificial Intelligence, John Wiley & Sons, 2013. The dynamic programming form of MDP is based on the concepts of states, actions (or decisions), and rewards (and/or penalties).

Figure 9:
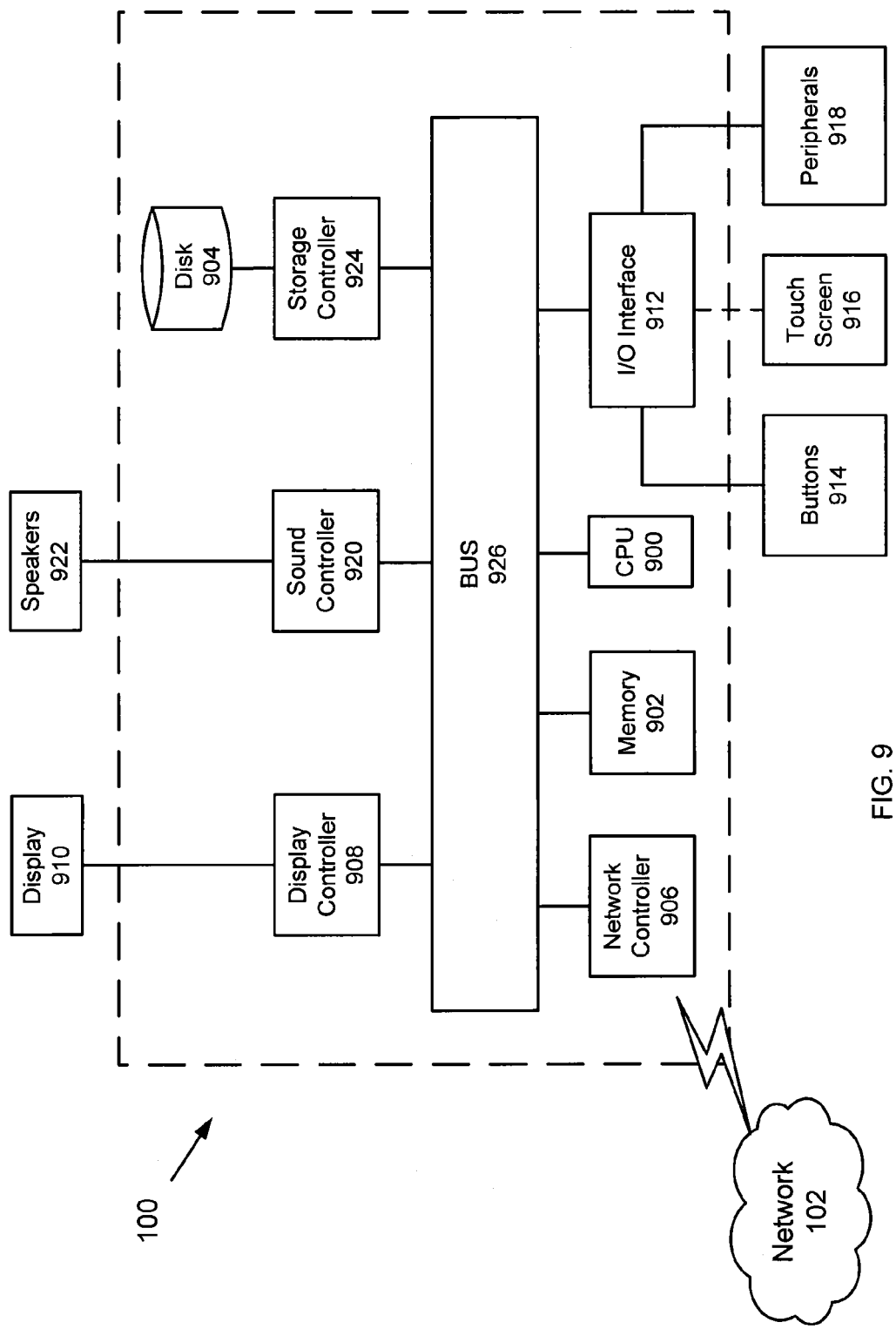
FIG. 9 is an exemplary block diagram of the development workstation according to one example.

FIG. 1 is a schematic of a development workstation 100 upon which to execute a method for code refactoring according to one example. The development workstation 100 includes a central processing unit (CPU) 900 and a memory 902, as shown in FIG. 9. Program codes (e.g., software programs) and data are loaded into the memory 902 for execution and processing by the CPU 900 and results are generated for display, output, transmittal, or storage. For example, a user (e.g., developer) may load a software code to be refactored into the memory 902 of the development workstation 100.

In one embodiment, the user may upload the software code to the development workstation 100 via a network 102. The network 102 may include the Internet or any other network capable of communicating data between devices. Suitable networks can include or interface with any one or more of a local intranet, a PAN (Personal Area Network), a LAN (Local Area Network), a WAN (Wide Area Network), a MAN (Metropolitan Area Network), a VPN (Virtual Private Network), or a SAN (storage area network). In one example, the development workstation 100 may also communicate via the network 102 with client devices having compiler tools for locally compiling source code to determine whether a code needs refactoring. For example, the CPU 900 may analyze build error in order to identify source code fragments for refactoring.

The software code may be in JavaScript, PHP (Hypertext Preprocessor), C++, HTML (Hyper Text Markup Language), XAML (Extensible Application Markup Language), CSS (Cascading Style Sheets), Razor, or any other language. The code may also be code written in HDL (Hardware Description language).

As described further below, the CPU 900 determines an optimal order of refactoring steps. Further, the CPU 900 may automatically apply the refactoring steps (transformations) in the optimal order to an original code 104 to produce a refactored code 106.

The method described herein may be based on a Markov decision process-based model. An MDP is characterized by a set S of states $\{s_1, s_2, \ldots, s_S\}$ which characterize the current situation of the system. The states can be real-valued or discrete-valued (scalars or vectors).

The MDP is also characterized by a set A of actions $\{a_1, a_2, \ldots, a_A\}$ which characterize the current situation of the system. Each action is associated with a level of uncertainty. As such, it is not guaranteed that the agent (decision maker) performs (executes) a specific action. In addition, the MDP is characterized by rewards that are associated with each state and action. Therefore, a reward is observed for each transition between two specific states. For example, the agent obtains the reward r(s,a) if it executes action a in state s.

Figure 2:
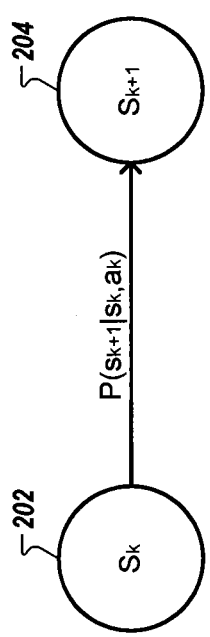
FIG. 2 is a schematic that shows a Markov decision process (MDP) model according to one example.

FIG. 2 is a schematic that shows a Markov decision process (MDP) model according to one example. FIG. 2 shows a transition from a first state $s_k$ 200 to a second state $s_{k+1}$ 202 after taking action $a_k$. The software state vector may include software metrics and bad smells.

A software module (or whole system) is at the first state 200 at the $k^{th}$ iteration of a refactoring process. The state vector, $s_k$, encodes various attributes of the software including software metrics and other quality measures. At this instant, k, the agent applies a specific refactoring decision (action $a_k$) which affects the state of the software module to transition to the second state $s_{k+1}$ 202. Due to the specific action, a predetermined reward (or penalty) is collected by the agent. The reward can be a simple formulation of quality improvement or degradation. In the present disclosure, the immediate state reward and multi-attribute utility function are formulated using a heuristic approach. Another representation of the same problem consists of a discretized grid world where the agent keeps iterating and taking refactoring decisions until the end of the process.

Figure 3:
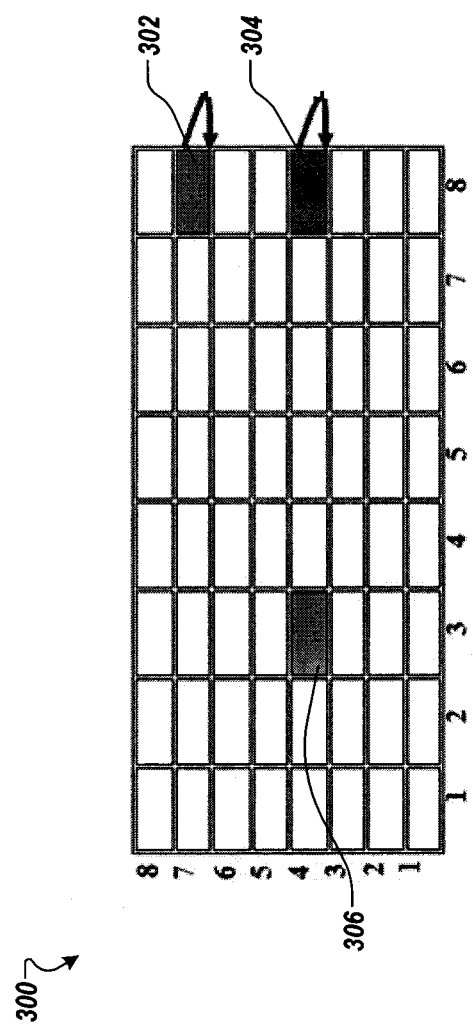
FIG. 3 is a schematic that shows a grid world of a software module according to one example.

FIG. 3 is a schematic that shows a grid world 300 of a software module according to one example. In the grid world 300, the agent keeps iterating from one software state to another based on a "estimated" transition probabilities $p(s_{k+1}|s_k, a_k)$. The software refactoring process described herein has two terminal states indicated by 302 and 304. The terminal states are commonly referred as "absorbing" states in the MDP terminology. Once in one of these states, the cycle of the MDP process terminates. For example, once the CPU 900 determines that a terminal state is reached the process end. The terminal states include a successful state 302 and a failed state 304 which represents a successful and a failed software refactoring processes respectively. Each grid in FIG. 3 represents a specific software state that encodes several software metrics and other quality measures as described herein. In each grid, the agent can take one action (or make one decision) among A possible ones. For instance, when the agent is in state <3, 4> denoted by cell 306 in the grid world 300, the agent can execute any possible refactoring step from the A available ones. However, due to uncertainty associated with the decision making process, it may not take place. In this case, the refactoring process decision may lead to a software state where quality is not as good as expected. Thus, the method described herein determines the effect of such decision on the overall final software quality. The method described herein identifies the "optimal" refactoring decision for any software state. Each state such as state <3, 4> 306 above has some rewards associated with it as shown in FIG. 4.

Figure 4:
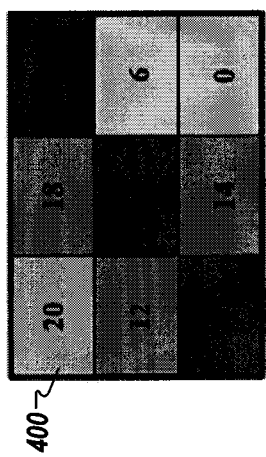
FIG. 4 is a schematic of an exemplary software state according to one example.

FIG. 4 is a schematic of an exemplary software state according to one example. Nine possible refactoring decisions (actions) are available for each software state, such as state <3, 4>. Making any of these refactoring decisions results in a utility value for that state. Therefore, the agent (CPU 900) takes the refactoring decision with the highest utility value. In this example, decision 400 which has an utility value of 20.

The software refactoring process iterates through several software states at any specific level (e.g., class, use case, package levels). Each software state may include a set of software metrics, a number of bad smells, the number of smell types, and the number of smells per smell type. The number of states is arbitrary and, therefore, can be very large. The set of software states can be quantized into a finite and computationally-efficient subsets without compromising the resulting "optimal" refactoring policy.

The bad smells may include data class, feature envy, lazy class, shotgun surgery, and the like as would be understood by one of ordinary skill in the art.

A data class may include classes that contain only fields and crude methods for accessing them. The data class stores data, does not contain any additional functionality, and cannot operate on the data. Feature Envy includes methods that make extensive use of another class. The method accesses the data of another object more than its own data. Lazy class (or freeloader) is a class that is not doing enough and can be collapsed or combined into another class. Shotgun surgery is when a change in one class requires cascading changes in several related classes.

The software metrics may include internal attributes and external attributes. Internal attributes are attributes that can be defined (measured) purely in terms of software product, process, or resource itself. The internal attributes may include number of children (NOC), coupling between objects (CBO), weighted methods per class (WMC), lines of code (LOC), lack of cohesion on methods (LCOM).

The NOC is defined as the number of classes that inherit directly from a given class. The CBO is defined as the number of distinct non-inheritance related classes to which a given class is coupled. A class is coupled to another if it uses methods or attributes of the coupled class. A WMC is defined as the number of methods defined (implemented) in a given class. The WMC measures the complexity of an individual class (weighted sum of all the methods in a class). In one embodiment, the WMC is the number of methods defined in each class when all methods of a class are equally complex. LOC is defined as the total source lines of code in a class excluding all blank and comment lines. LCOM is defined as the number of pairs of member functions without shared instance variables, minus the number of pairs of member functions with shared instance variables. In one embodiment, the WMC metric is set to zero whenever the subtraction is negative.

The external attributes are attributes that can only be defined (measured) with respect to how the software relates to other entities in the software's environment. External attributes may include, but are not limited to, maintainability, usability, efficiency, and reliability. The maintainability includes a set of attributes that bear on the effort needed to make specified modifications. Usability includes a set of attributes that bear on the effort needed for use, and on the individual assessment of such use, by a stated or implied set of users. Efficiency includes a set of attributes that bear on the relationship between the level of performance of the software and the amount of resources used, under stated conditions. Reliability includes a set of attributes that bear on the capability of software to maintain its level of performance under stated conditions for a stated period of time.

At each software state, the agent may decide to act according to any of the available actions (total number of refactoring actions). The set of actions may be finite and may contain a limited number of refactoring decisions.

A state S of a segment of software code may be defined by a plurality of methods. For example, the state may include average number of lines per method, average number of methods per class, average number of classes per package, number of packages, value of each software metric used, and value of each bad smell considered.

However, it should be noted that since each state attribute may have a wide dynamic range, the resulting state space can be extremely huge. In one example, only range values are considered. In one example, when the average number of lines ranges from 1 to 1000, quantized values in steps of 100 are considered. The dynamic range of the attribute consists of 10 discrete values instead of 1000 which drastically reduce the size of the resulting state space.

The reward resulting from each refactoring is a function of the reduction in the number of bad smells, the improvement in the values of software metrics, or other software factors. Since the reward consists of conflicting elements such as conflicting software metrics (e.g., reusability may conflict with complexity, coupling may conflict with cohesion), a heuristic optimization may be used to determine a combination of the reward components. In one embodiment, the reward may be expressed as:

$$r(s_k, a_k, s_{k+1}) = \sum_{i=1}^{L} w_i \cdot v_i \qquad (1)$$

where $w_i$ is the weights, v is an utility function. In one embodiment, the weights, $w_i$'s, are "optimized using genetic algorithms or any hill climbing optimization routine as would be understood by one of ordinary skill in the art.

In one embodiment, v may include a combination of a first quantity related to bad smells and a second quantity related to software metrics. In one embodiment $v_i$ may be expressed as:

$$v_i = w_1 \cdot \text{bad\_smell} + w_2 \cdot \text{software\_metric} \qquad (2)$$

wherein $w_1$ is a first weight factor and $w_2$ is a second weight factor. In one example, the first and the second weight factors may vary from zero to one as a function of the importance of each quantity (e.g., bad smells, software metrics). Depending on the application at hand, more focus is given to either bad smells or software metrics. The first and the second weight may have predetermined values set by the user. In one example, the weights may be based on past refactoring results. In other examples, the first and the second quantities are equally scaled to form the utility value v. In one embodiment, the first and second weight factors are optimized using genetic programming as would be understood by one of ordinary skill in the art.

The optimal value function is defined in terms of the resulting software quality measures where all bad smells are successfully removed from the software class or module after applying the sequence of "optimal" refactoring decisions. The optimal value function attains its highest value at the terminal (absorbing) state that the software component may reach after applying the "optimal" software refactoring policy determined by the CPU 900 using the methodology described herein.

Figure 5:
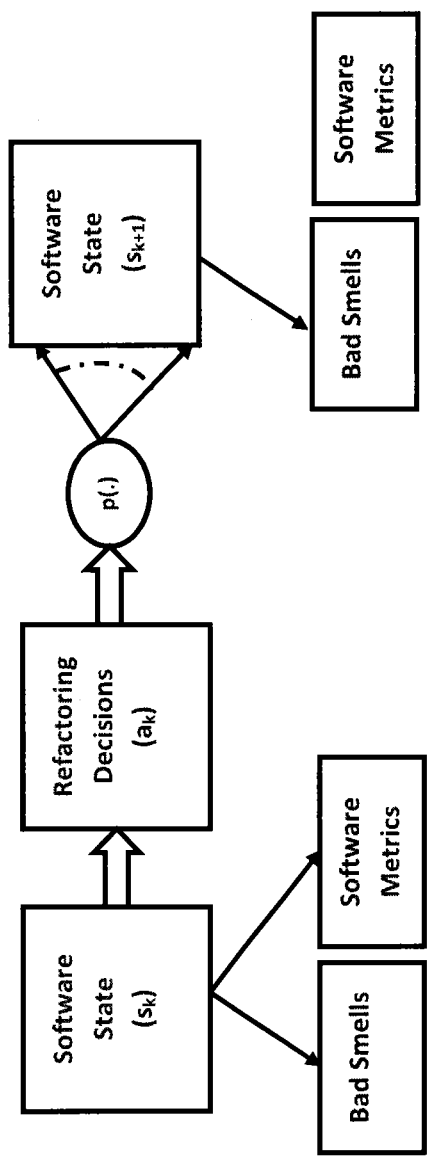
FIG. 5 a schematic that shows a simulation model for estimating the transition probabilities according to one example.

FIG. 5 is a schematic that shows a simulation model for estimating the transition probabilities according to one example. Since the software states evolve between |S| different states by taking one of possible |A| refactoring decisions (or actions), a system for $k^{th}$ estimation of the transition probabilities, $p(s_{k+1}|s_k, a_k)$, is devised using the simulation model as shown in FIG. 5.

Using the simulator model, shown in FIG. 5, reliable estimates of $p(s_{k+1}|s_k, a_k)$ can be derived using enumeration techniques as described in M. L. Puterman, Markov Decision Processes: Discrete Stochastic Dynamic Programming, John Wiley & Sons, 2014.

Given the set of states, S, actions, A, transition probabilities, $p(s_{k+1}|s_k, a_k)$, and rewards, $r(s_k, a_k, s_{k+1})$, the software refactoring MDP acts over a horizon K to determine a refactoring policy, π, that maximizes the expected sum of rewards. The refactoring policy may be expressed as follows:

$$\pi^* = \arg\max_{\pi} E\left[\sum_{k=0}^{K} r(s_k, a_k, s_{k+1}) \,\middle|\, \pi\right] \qquad (3)$$

The optimal policy above can be derived using the following value iteration algorithm:

Start with $V_0^*(s)=0$ for all states s in S. For k=1, 2, . . . , K, given $V_k^*(s)=0$, calculate for all states s in S.

$$V_{k+1}^*(s) \leftarrow \max_a \sum_{s'} p(s'|s, a)[r(s, a, s') + V_k^*(s')] \qquad (4)$$

Equation (4) above is known as the value update or the Bellman update/back-up and the value quantity, $V_k^*(s)$, represents the expected sum of rewards accumulated when starting from state s and acting optimally for a horizon of k steps. Using high values of K, the value function converges to the optimal value function V*. Other algorithms can be used to reach the same optimal policy (e.g., policy iteration, q-state iteration algorithms) as would be understood by one of ordinary skill in the art.

Figure 6:
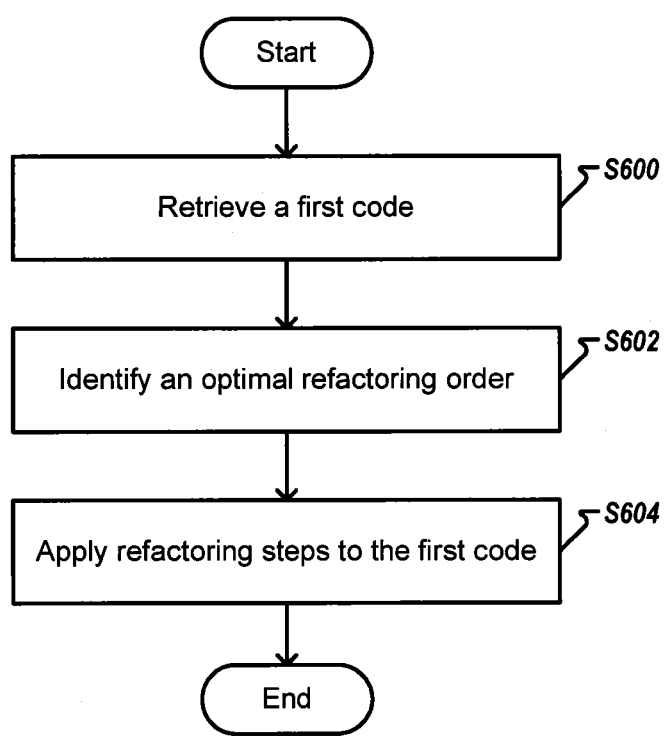
FIG. 6 is a flow chart illustrating a method to determine an order of refactoring steps according to one example.

FIG. 6 is a flow chart illustrating a method to determine an order of refactoring steps according to one example. At step S600, a request for refactoring may be received. For example, the process may start with the receipt of one or more code files. A compiler may parse, apply type attribution, and generate binary code (e.g., Java bytecode). The parser/compiler may include one or more components that can recognize expressions provided using a known syntax and then generate suitable program components for providing functionality associated with the known syntax. In other examples, the code may be retrieved from the memory 902. Additionally or alternatively, the refactoring process may start at predetermined instances.

At step S602, the CPU 900 may identify an optimal refactoring order. The CPU 900 identifies the optimal refactoring order that maximizes the expected sum of rewards as expressed in Equation (3). In one example, all bad smells and software metrics may be used to determine the optimal refactoring order. In other examples, the CPU 900 may provide the user with a user interface to select one or more bad smells and one or more software metrics. For example, the user may be presented with a drop-down menu or other selection control for identifying the one or more bad smells and the one or more software metrics. The CPU 900 determines the optimal refactoring order based on the one or more bad smells and the one or more software metrics selected by the user.

At step S604, the refactoring steps are applied following the optimal refactoring order determined at step S602.

The following refactoring methods can be applied for each of the bad smell type once the optimal order is identified. Table 1 shows exemplary refactoring methods.

TABLE 1

Exemplary refactoring methods for different bad smell types

| Bad smell | Refactoring |
| --- | --- |
| Data Class | Move Method |
|  | Encapsulate Field |
|  | Encapsulate Collection |
| Feature Envy | Extract Method |
|  | Move Method |
|  | Move Field |
| Lazy Class (Freeloader) | Collapse Hierarchy |
|  | Inline Class |
|  | Inline Singleton |
| Shotgun Surgery | Move Method |
|  | Move Field |
|  | Inline Class |

The CPU 900 may apply different types of refactoring methods, including "move method", "encapsulate field", "encapsulate collection", "extract method", "move field", "collapse hierarchy", "inline class", "inline singleton". Each of these different types of refactorings is briefly described.

"Move method": In response to the CPU 900 determining that a first method, defined on a first class, is using or is used by more features of a second class, the CPU 900 may create a second method defined in the second class. The second method has a similar body of the first method. Then, the first method may be turned to a simple delegation or removed.

"Encapsulate Field": The CPU 900 makes the public field as a private and provides accessors.

"Encapsulate Collection": In response to the CPU 900 determining that a method returns a collection, the method is changed to return a read-only view and provide add/remove methods.

"Extract Method": The fragments are combined together. The new fragment is turned into a method. In one example, the name of the new method may be a function of the purpose of the method.

"Move Field": When a field is, or will be, used by another class more than the class on which it is defined, a new field is created in the target class. The users of the field are changed.

"Collapse Hierarchy": The superclass and subclass are merged when the superclass and subclass are not very different.

"Inline Class": When a class is not doing very much, the features of the class are moved to another class. Then, the class is deleted.

"Inline Singleton": when a code "singleton" needs access to an object but does not need a global point of access to it, the singleton's features are moved to a class that stores and provides access to the object. The singleton is deleted.

Figure 7:
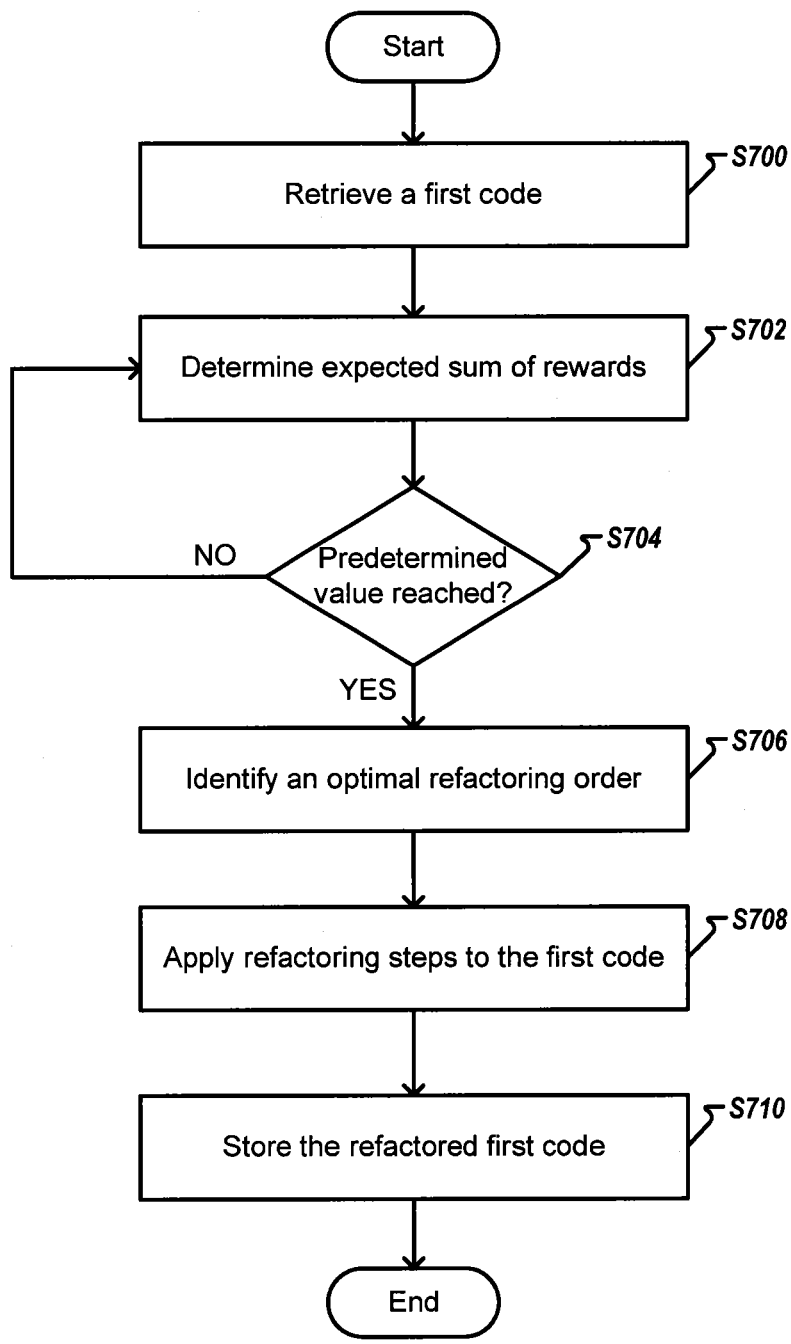
FIG. 7 is a flow chart illustrating a method for code refactoring according to one example.

FIG. 7 is a flow chart illustrating a method for code refactoring according to one example. At step S700, the CPU 900 may retrieve a first code. The first code may be an original code where a refactoring process has not been started yet. In other examples, the first code may be a code wherein one or more refactoring steps have been applied by the user. At step S702, the expected sum of rewards may be calculated using Equation (4). Equation (4) is applied for all states. Then, a counter may be updated by an incremental value (e.g., one). At step S704, the CPU 900 may check to see whether the counter has reached a predetermined value (K). The predetermined value may be set by the user. In other examples, the predetermined value may be based on previous refactoring data to provide the optimal refactoring sequence. In response to determining that the counter has reached the predetermined value, the flow goes to step S706. At step S706, the refactoring order is identified.

At step S708, the refactoring steps are applied following the optimal refactoring order determined at step S706. In one example, the optimal refactoring order may be transmitted to another device (e.g., client devices, servers) where the refactoring steps may be executed. Then, the refactored first code may be stored at step S710. In one example, the refactored first code may be transmitted to a third party device via the network 102.

Figure 8:
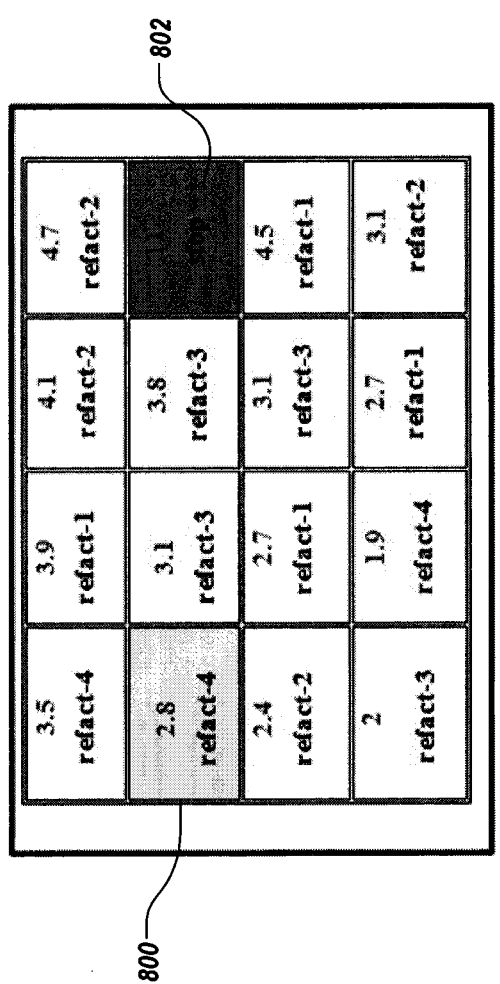
FIG. 8 is a schematic that shows an optimal refactoring policy according to one example.

FIG. 8 is a schematic that shows an optimal refactoring policy according to one example. The resulting optimal software refactoring policy using 16 software states, S, and 4 possible refactoring actions, A. At each software state, $s_k$, the agent has a pre-defined "optimal" refactoring decision. For instance, at a state 800 the optimal refactoring decision that the agent should make is: "apply refact-4" which may represent the fourth available refactoring process. The refactoring process ends when state 802 is reached.

Next, a hardware description of the development workstation 100 according to exemplary embodiments is described with reference to FIG. 9. In FIG. 9, the development workstation 100 includes a CPU 900 which performs the processes described herein. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the development workstation 100 communicates, such as a server or computer.

Further, the claimed advancements may be provided as a utility application, background daemon, or component of an operating system, or combination thereof, executing in conjunction with CPU 900 and an operating system such as Microsoft Windows 7, UNIX, Solaris, LINUX, Apple MAC-OS and other systems known to those skilled in the art.

In order to achieve the development workstation 100, the hardware elements may be realized by various circuitry elements, known to those skilled in the art. For example, CPU 900 may be a Xenon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The development workstation 100 in FIG. 9 also includes a network controller 906, such as an Intel Ethernet PRO network interface card from Intel Corporation of America, for interfacing with network 102. As can be appreciated, the network 102 can be a public network, such as the Internet, or a private network such as LAN or WAN network, or any combination thereof and can also include PSTN or ISDN sub-networks. The network 102 can also be wired, such as an Ethernet network, or can be wireless such as a cellular network including EDGE, 3G and 4G wireless cellular systems. The wireless network can also be WiFi, Bluetooth, or any other wireless form of communication that is known.

The development workstation 100 further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a an optional touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the development workstation 100, such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the development workstation 100. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in the circuitry on a single chipset.

Figure 10:
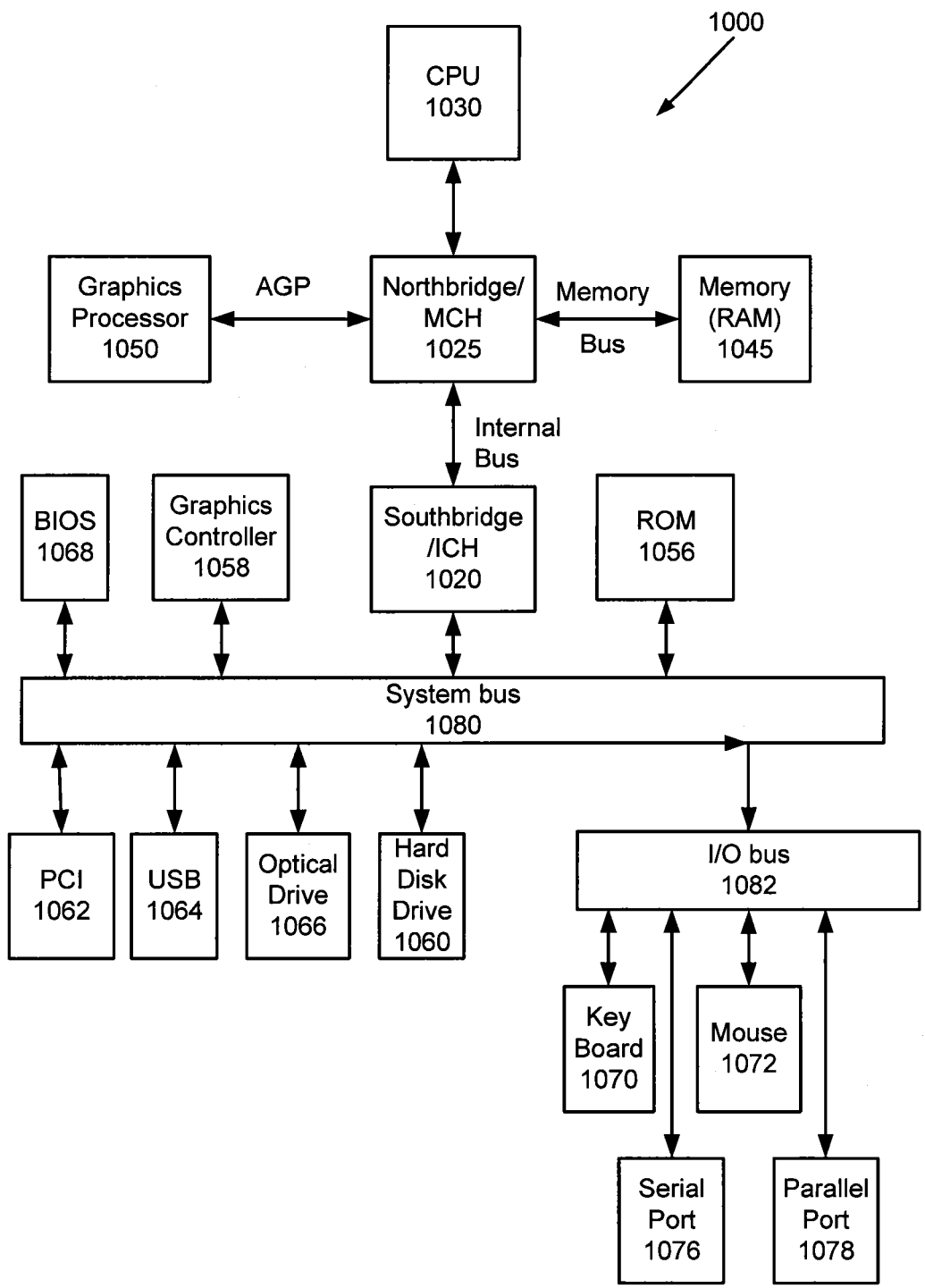
FIG. 10 is an exemplary block diagram of a data processing system according to one example.

FIG. 10 shows a schematic diagram of a data processing system, according to certain embodiments, for identifying an optimal refactoring order utilizing the methodologies described herein. The data processing system is an example of a computer in which specific code or instructions implementing the processes of the illustrative embodiments may be located to create a particular machine for implementing the above-noted process.

Figure 11:
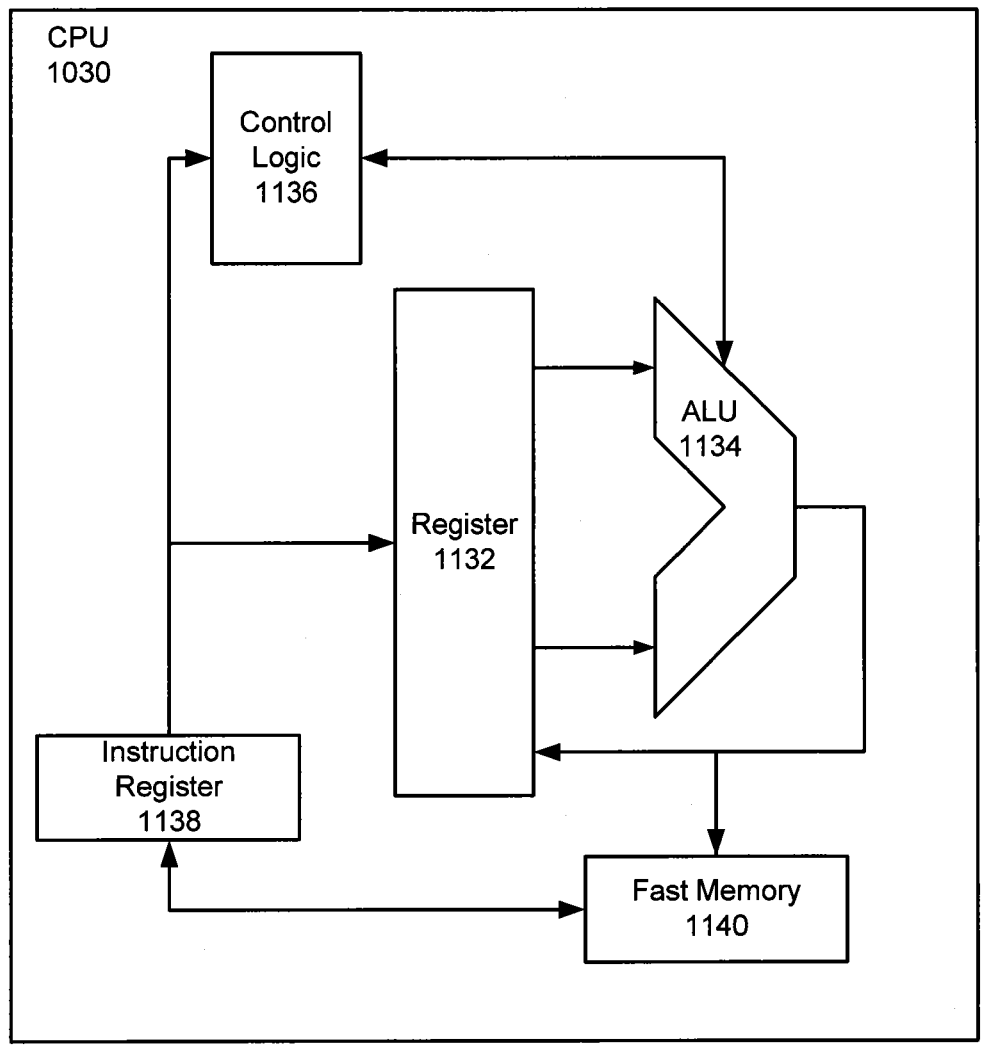
FIG. 11 is an exemplary block diagram of a central processing unit according to one example.

In FIG. 10, data processing system 1000 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU 1030 may contain one or more processors and may even be implemented using one or more heterogeneous processor systems. For example, FIG. 11 shows one implementation of CPU 1030.

Further, in the data processing system 1000 of FIG. 10, SB/ICH 1020 is coupled through a system bus 1080 to an I/O Bus 1082, a read only memory (ROM) 1056, an universal serial bus (USB) port 1064, a flash binary input/output system (BIOS) 1068, and a graphics controller 1058. In one implementation, the I/O bus can include a super I/O (SIO) device.

PCI/PCIe devices can also be coupled to SB/ICH 1020 through a PCI bus 1062. The PCI devices may include, for example, Ethernet adapters, add-in cards, and PC cards for notebook computers. Further, the hard disk drive (HDD) 1060 and optical drive 1066 can also be coupled to the SB/ICH 1020 through the system bus 1080. The Hard disk drive 1060 and the optical drive or CD-ROM 1066 can use, for example, an integrated drive electronics (IDE) or serial advanced technology attachment (SATA) interface.

In one implementation, a keyboard 1070, a mouse 1072, a serial port 1076, and a parallel port 1078 can be connected to the system bus 1080 through the I/O bus 1082. Other peripherals and devices that can be connected to the SB/ICH 1020 include a mass storage controller such as SATA or PATA (Parallel Advanced Technology Attachment), an Ethernet port, an ISA bus, a LPC bridge, SMBus, a DMA controller, and an Audio Codec (not shown).

In one implementation of CPU 1030, the instruction register 1138 retrieves instructions from the fast memory 1140. At least part of these instructions are fetched from the instruction register 1138 by the control logic 1136 and interpreted according to the instruction set architecture of the CPU 1030. Part of the instructions can also be directed to the register 1132. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain implementations, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

The present disclosure is not limited to the specific circuit elements described herein, nor is the present disclosure limited to the specific sizing and classification of these elements.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

The hardware description above, exemplified by any one of the structure examples shown in FIG. 9 or 10, constitutes or includes specialized corresponding structure that is programmed or configured to perform the algorithm shown in FIG. 6.

An apparatus that includes the features in the foregoing description provides numerous advantages to users. In particular, the apparatus and associated methodology described herein automatically identifies an optimal refactoring order. In addition, the method applies the refactoring steps according to the identified refactoring order. The methodology described herein could not be implemented by a human due to the sheer complexity of data, optimizing and calculating and includes a variety of novel features that result in significantly more than any construed abstract idea. In addition, the present disclosure has the advantage of finding the optimal refactoring process thus minimizing computation and increasing processing speed of software codes.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for code refactoring comprising:
acquiring a code;
identifying, using processing circuitry and based on a Markov decision process model, a refactoring sequence, wherein the refactoring sequence includes a plurality of refactoring steps to be applied to the code;
wherein the Markov decision process model include:
identifying a plurality of states, each state representing a potential state of the code;
identifying a plurality of actions, wherein each action corresponds to a refactoring step;
determining transition probabilities using enumeration techniques wherein each transition probability represents the probability that the code transition from a current state to a subsequent state by taking an action from the plurality of actions that cause the transition to the subsequent state;
determining a set of rewards, wherein each reward is associated with each of the transition probabilities;
determining a refactoring policy that maximizes a sum of rewards as a function of the plurality of states, the plurality of actions, the transition probabilities, and the set of rewards; and
applying, using the processing circuitry, the plurality of refactoring steps according to the refactoring sequence to generate a refactored code.

2. The method of claim 1, wherein the reward is a function of software metrics and bad smells attributes.

3. The method of claim 2, wherein the software metrics and bad smells attributes have predetermined weights.

4. The method of claim 2, wherein the predetermined weights are determined using a genetic algorithm.

5. The method of claim 2, wherein the software metrics include internal and external attributes.

6. The method of claim 5, wherein the internal attributes include at least one of number of children, coupling between objects, weighted methods per class, lines of code, and lack of cohesion on methods.

7. The method of claim 5, wherein the external attributes include at least one of maintainability, usability, efficiency, and reliability.

8. The method of claim 1, wherein determining the reward includes applying:

$$r(s_k, a_k, s_{k+1}) = \sum_{i=1}^{L} w_i \cdot v_i$$

where r is the reward for transitioning from state $s_k$ to state $s_{k+1}$ by taking action $a_k$, $w_i$ is the weight of each utility function, wherein the utility function is based on software metrics and bad smell attributes.

9. The method of claim 1, wherein determining the refactoring policy includes applying:

$$\pi^* = \arg\max_{\pi} E\left[\sum_{k=0}^{K} r(s_k, a_k, s_{k+1}) \middle| \pi\right]$$

where $\pi$ is the refactoring policy, r is the reward for transitioning from state $s_k$ to state $s_{k+1}$ by taking action $a_k$, E is the expected sum of rewards, and K is a predetermined number.

10. The method of claim 1, wherein the code is acquired from an external device.

11. The method of claim 1, wherein the refactoring sequence is transmitted to an external device using communication circuitry.

12. An apparatus for code refactoring comprising:
processing circuitry configured to:
  acquire a code,
  identifying, based on a Markov decision process model, a refactoring sequence, wherein the refactoring sequence includes a plurality of refactoring steps to be applied to the code;
  wherein the Markov decision process model include:
    identifying a plurality of states, each state representing a potential state of the code;
    identifying a plurality of actions, wherein each action corresponds to a refactoring step;
    determining transition probabilities using enumeration techniques wherein each transition probability represents the probability that the code transition from a current state to a subsequent state by taking an action from the plurality of actions that cause the transition to the subsequent state;
    determining a set of rewards, wherein each reward is associated with each of the transition probabilities;
    determining a refactoring policy that maximizes a sum of rewards as a function of the plurality of states, the plurality of actions, the transition probabilities, and the set of rewards; and
  applying the plurality of refactoring steps according to the refactoring sequence to generate a refactored code.

13. The apparatus of claim 12, wherein the reward is a function of software metrics and bad smells attributes.

14. The apparatus of claim 12, wherein determining the reward includes applying:

$$r(s_k, a_k, s_{k+1}) = \sum_{i=1}^{L} w_i \cdot v_i$$

where r is the reward for transitioning from state $s_k$ to state $s_{k+1}$ by taking action $a_k$, $w_i$ is the weight of each utility function, wherein the utility function is based on software metrics and bad smell attributes.

15. The apparatus of claim 12, wherein determining the refactoring policy includes applying:

$$\pi^* = \arg\max_{\pi} E\left[\sum_{k=0}^{K} r(s_k, a_k, s_{k+1}) \middle| \pi \right]$$

where $\pi$ is the refactoring policy, r is the reward for transitioning from state $s_k$ to state $s_{k+1}$ by taking action $a_k$, E is the expected sum of rewards, and K is a predetermined number.

16. A non-transitory computer readable medium storing computer-readable instructions therein which when executed by a computer cause the computer to perform a method for code refactoring, the method comprising:
  acquiring a code;
  identifying, based on a Markov decision process model, a refactoring sequence, wherein the refactoring sequence includes a plurality of refactoring steps to be applied to the code;
  wherein the Markov decision process model include:
    identifying a plurality of states, each state representing a potential state of the code;
    identifying a plurality of actions, wherein each action corresponds to a refactoring step;
    determining transition probabilities using enumeration techniques wherein each transition probability represents the probability that the code transition from a current state to a subsequent state by taking an action from the plurality of actions that cause the transition to the subsequent state;
    determining a set of rewards, wherein each reward is associated with each of the transition probabilities;
    determining a refactoring policy that maximizes a sum of rewards as a function of the plurality of states, the plurality of actions, the transition probabilities, and the set of rewards; and
  applying the plurality of refactoring steps according to the refactoring sequence to generate a refactored code.

* * * * *